(12) United States Patent
Ylirinne

(10) Patent No.: US 11,632,274 B2
(45) Date of Patent: Apr. 18, 2023

(54) METHODS FOR PROVIDING A PULSE-WIDTH MODULATED POWER SIGNAL, NODE AND SYSTEM

(71) Applicant: Vacon Oy, Vaasa (FI)

(72) Inventor: Petri Ylirinne, Vaasa (FI)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 17/666,619

(22) Filed: Feb. 8, 2022

(65) Prior Publication Data

US 2022/0255777 A1    Aug. 11, 2022

(30) Foreign Application Priority Data

Feb. 10, 2021 (DE) .................... 102021103155.9

(51) Int. Cl.
*H03K 7/04* (2006.01)
*H04L 25/49* (2006.01)

(52) U.S. Cl.
CPC ................... *H04L 25/4902* (2013.01)

(58) Field of Classification Search
CPC .. H03K 7/08; H01B 5/16; H01B 1/026; H02P 27/08

USPC ................................... 375/238, 376
See application file for complete search history.

(56) References Cited

U.S. PATENT DOCUMENTS

| | | | |
|---|---|---|---|
| 5,317,248 A | 5/1994 | Utley et al. | |
| 8,159,771 B2* | 4/2012 | Cheng | G11B 33/1406 360/123.01 |
| 2014/0225521 A1* | 8/2014 | Reed | H02M 1/10 323/349 |
| 2015/0245429 A1* | 8/2015 | Niggemeyer | H05B 45/56 315/113 |
| 2017/0264188 A1* | 9/2017 | Andersen | H02M 7/217 |
| 2018/0175730 A1* | 6/2018 | Leong | H02M 3/158 |

FOREIGN PATENT DOCUMENTS

DE    694 01 843 T2    6/1997

\* cited by examiner

*Primary Examiner* — Khai Tran
(74) *Attorney, Agent, or Firm* — McCormick, Paulding & Huber PLLC

(57) ABSTRACT

The invention relates to methods for providing a pulse-width modulated power signal in which control signals are used to define phase states and duration. The invention further relates to a corresponding node and to a corresponding system.

20 Claims, 3 Drawing Sheets

METHODS FOR PROVIDING A PULSE-WIDTH MODULATED POWER SIGNAL, NODE AND SYSTEM

CROSS-REFERENCE TO RELATED APPLICATION

This application claims foreign priority benefits under U.S.C. § 119 to German Patent Application No. 102021103155.9 filed on Feb. 10, 2021, the content of which is hereby incorporated by reference in its entirety.

TECHNICAL FIELD

The invention relates to methods for providing a pulse-width modulated power signal, a corresponding node for providing a pulse-width modulated power signal, and to a corresponding system for providing a pulse-width modulated power signal.

BACKGROUND

Pulse-width modulated power signals are commonly used in order to control power consuming devices. For example, the speed of a motor, a power converter, or the brightness of a light emitting device may be controlled by pulse-width modulation. Often a plurality of nodes is used to implement pulse-width modulation, wherein respective phases of each node are coupled together in order to reach higher output power. Synchronization between such nodes is important to ensure functionality.

SUMMARY

It is an object of the present invention to provide methods, a corresponding node and a corresponding system for providing a pulse-width modulated power signal that is different or improved with respect to the prior art. This is achieved by methods, a node and a system according to the main claims. Preferred implementations are claimed in the dependent claims.

The invention relates to a method for providing a pulse-width modulated power signal with one or more phases at a node having a timer, the method comprising the following steps:
 receiving, from a central unit, a control signal, the control signal comprising a state for each of the phases and a time stamp,
 applying the control signal such that each phase is controlled according to its state, until the timer reaches the time stamp, and
 when the timer reaches the time stamp, applying a further control signal received after the control signal.

With such a method, it is possible to very accurately provide a pulse-width modulated power signal that can be accurately synchronized with other nodes. The control signal provides for an easy definition of the intended switching or controlling of phases according to the required modulation. Each phase can be set separately, and the duration can be set individually for each control signal.

Usually, one or more phases are used such that the node may either forward the power of the respective phase in full or partly to a controlled entity, or not. The time stamp may set a duration or moment in time in a way that the actual time for which a combination of phase state is active is defined.

According to a possible implementation, a state may be a binary state. This means that the state has only two possible values. In such an implementation, a phase may be put on if its state has a first value and the phase may be put off if its state has a second value.

According to another possible implementation, a state may be a non-binary state. For example, a state may be a state having more than two possible values. In such an implementation, a phase may not only be switched on and off, but there may be also only a fraction of the power of a phase relayed. This fraction may be determined by the state. The state may also determine another polarity of a phase. For example, a state may have three different values. However, any other number of values can be used.

Applying a control signal may especially mean that a phase may pass the node if it is put on and may not pass the node if it is put off, or that a certain fraction of the power of a phase is relayed.

The timer is typically incremented continuously such that some timer value changes homogeneously. The timer may also be decremented continuously in a similar manner.

According to an implementation, the central unit may be a separate unit that has a different functionality to the nodes. This can especially mean that the central unit has not the functionality typical for a node, i.e. controlling phases. According to an alternative implementation, the central unit may be a node or may be integrated into a node. Thus, the central unit may also have the functionality typical for a node. In this case, the central unit may be regarded as a special type of node.

The steps of applying may especially be repeated consecutively with consecutively received control signals. This means that the node continuously receives control signals, and that the phase state values are also applied consecutively after expiration of the previous control signal. The receiving of the control signals does not have to be synchronized with the application.

Especially, three phases may be controlled by the node. This corresponds to typical implementations, for example with three motor phases. However, also other numbers of phases may be used. For example, only one phase can be used.

According to a preferred implementation, the timer is driven by a clock of the node. The clock may be a local clock. Thus, all necessary functionality for driving the timer is comprised in the node. However, also other implementations are possible. For example, a clock may be recovered from a communications channel and/or a communications network.

According to a preferred implementation, the timer is synchronized by receiving a timer synchronization signal from another node and putting the timer to a value being determined by the timer synchronization signal and a delay time. This can provide for an efficient and reliable timer synchronization between nodes, as delay times usually do not change during operation. The timers of several nodes may be synchronized in short time intervals to ensure exact synchronization during operation. The delay time may be determined, e.g. at startup.

The time stamp may especially be given as an absolute value, or as a duration. Giving it as an absolute value may especially mean that the state values of the control signal are applied until the timer has a value specified in the control signal. Giving it as a duration may especially mean that the state values of the control signal are applied until the timer has a value calculated by adding a value specified in the control signal to the timer value at which application of the previous control signal ended.

The phases may especially be controlled using respective Insulated Gate Bipolar Transistors of the node. In other words, the node may have such Insulated Gate Bipolar Transistors. They have been proven suitable to control large currents or voltages.

The Insulated Gate Bipolar Transistors may be arranged in an inverter bridge with an upper arm and a lower arm. As an alternative preferred example, Silicon Carbide MOSFETs can be used. However, also other kinds of transistors or other switches may be used.

Furthermore, the invention relates to a method for providing a pulse-width modulated power signal using a plurality of nodes and a central unit,
   wherein each node performs a method as described herein,
   wherein the central unit sends control signals according to a required pulse-width modulation scheme to the nodes, and
   wherein corresponding phases of the nodes are electrically coupled in parallel.

This means that the power delivered by the nodes may be combined. This leads to a significantly higher maximum output power. A pulse-width modulation scheme may be defined e.g. by an external entity such as a motor control. The central unit may produce suitable control signals and send them to the nodes.

The method may especially further comprise a timer synchronization, the timer synchronization comprising the following steps:
   sending, from at least one first node to at least one second node, a synchronization signal, the synchronization signal comprising a current timer value of the first node, and
   receiving, at least at the second node, the synchronization signal, and setting the timer of the second node to a value calculated as the current timer value comprised in the synchronization signal plus a delay value.

This allows for an efficient synchronization of the timers between the nodes such that it is ensured that all nodes have the same timer value and change it at the same times.

Especially, the synchronization may be performed in specified time intervals during operation. Such time intervals may be set such that possible drifts occurring between the nodes do not produce problems in operation.

Typically, the time interval may be at least 10 µs, at least 20 µs, at least 100 µs, or at least 500 µs; and/or at most 100 µs, at most 500 µs, or at most 1 ms. Especially, it may be 50 µs. Such values are suitable for typical applications. However, also other values can be used.

The method may especially further comprise a delay value determination, the delay value determination comprising the following steps:
   sending, from at least one first node to at least one second node, a first determination signal,
   receiving, at least at the second node, the first determination signal, and immediately after receiving the first determination signal sending, from at least the second note, a second determination signal back to at least the first node, and
   calculating the delay value based on a round-trip time of the determination signals.

This allows for efficient calculation of a delay value, especially between a first node and a second node which may also be called Slave and Master.

Especially, the delay value determination may be performed with startup of the nodes and the central unit. This may ensure that a current delay value is determined and is available during operation. However, the delay value determination may also be performed during run-time. For example, if it is to be expected that the delay value may change during operation, it is also possible to perform further delay value determinations during operation.

The delay value may especially be calculated by calculating a sum of the round-trip time and a previous delay value, and dividing the sum by two. This can allow for a smooth adjustment of delay values so that a possible error in the determination does not lead to problems.

The combination of nodes and a central unit can especially be called a system.

The invention relates further to a node for providing a pulse-width modulated power signal being configured to perform a method as described herein.

The invention relates further to a system for providing a pulse-width modulated power signal comprising a plurality of nodes and a central unit, the nodes and the central unit being configured to perform a method as described herein.

With respect to the methods, all implementations as described herein may be applied.

BRIEF DESCRIPTION OF THE DRAWINGS

The invention will now be described with respect to the enclosed drawing, in which.

DETAILED DESCRIPTION

Figure 1:
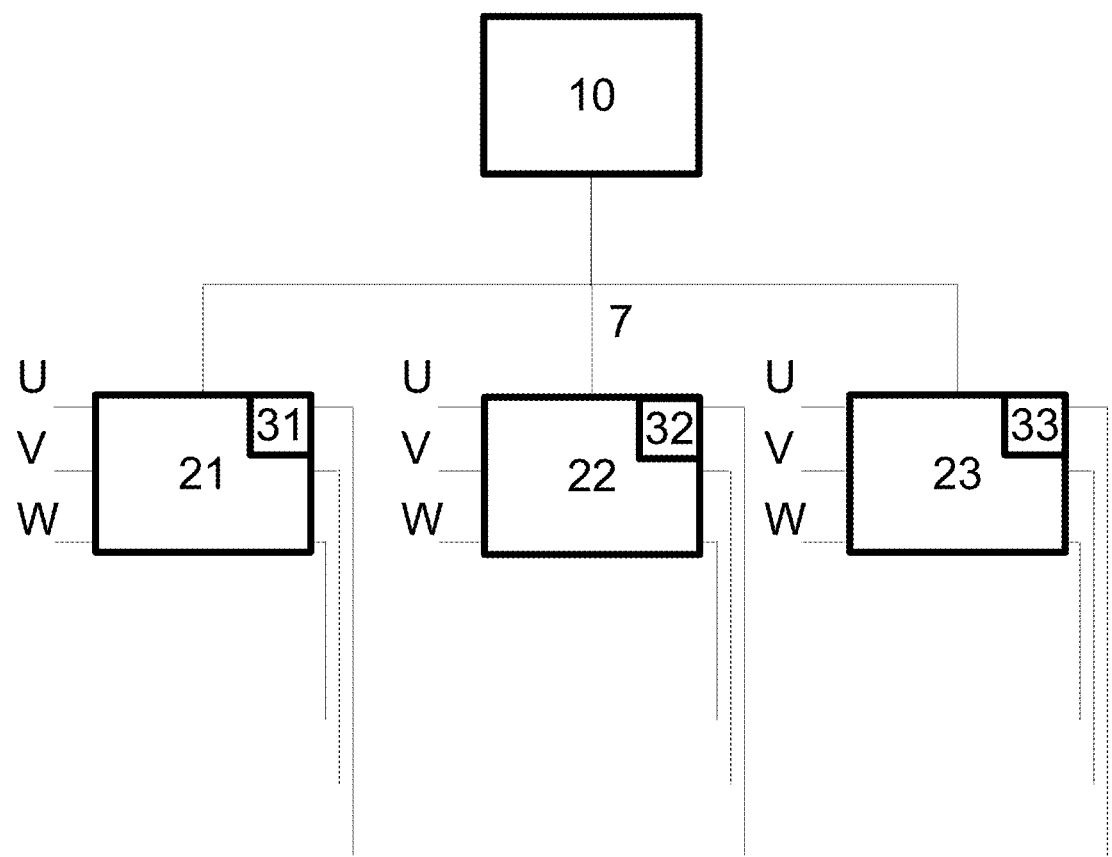
FIG. 1 shows a system for providing a pulse-width modulated power signal.

FIG. 1 shows a system 5 for providing a pulse-width modulated power signal according to a typical implementation.

The system 5 comprises a central unit 10 and three nodes 21, 22, 23 which are connected by a communication network 7. Each node controls three phases U, V, W in a way that it may relay each phase to a power consuming entity that is not shown in FIG. 1. The power consuming entity may be regarded as a power sink. Alternatively, the flow of power may be reversed. For example, also a power source may be connected to the phases U, V, W.

Each node 21, 22, 23 has its own internal timer 31, 32, 33. They provide for timer values that are increased continuously and are used in order to control switching of the phases U, V, W. This will be explained further below.

Figure 2:
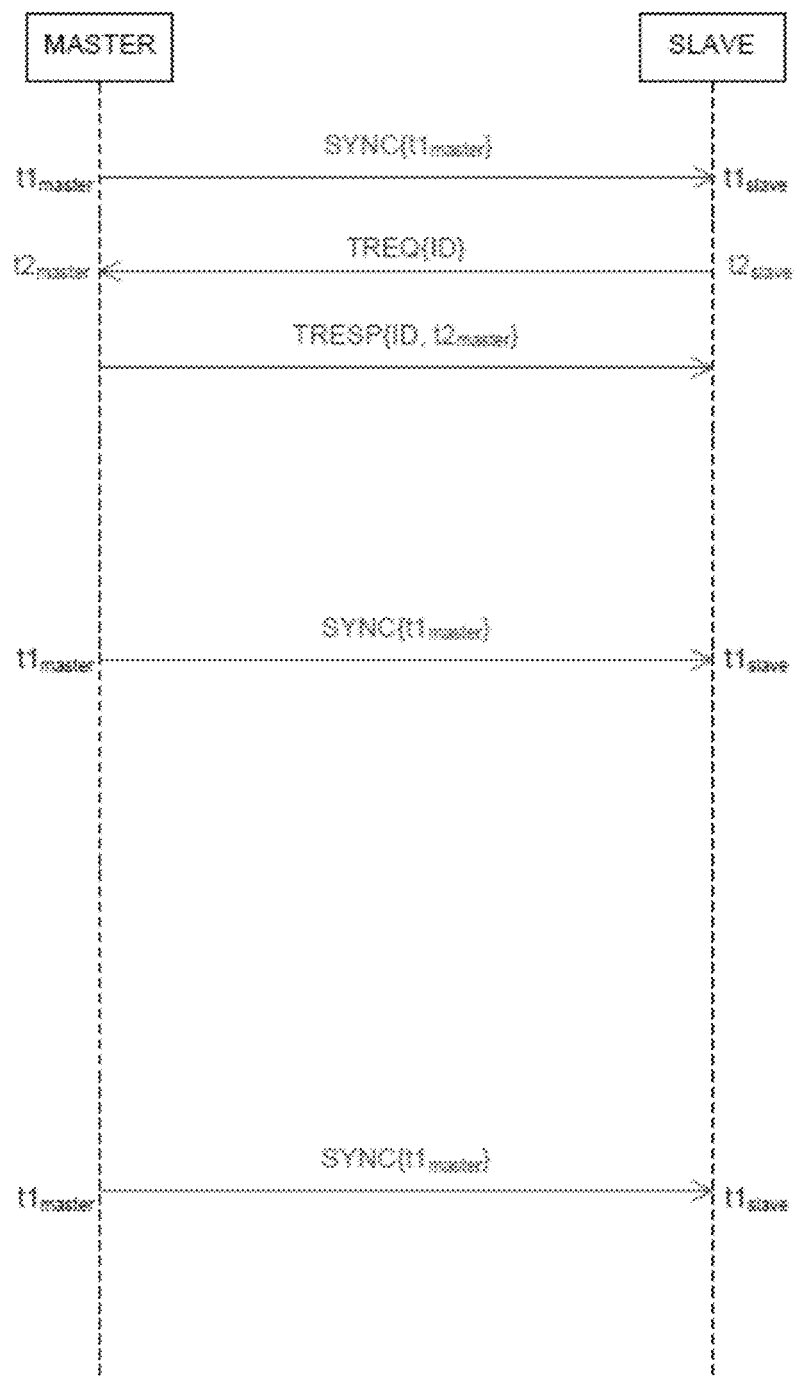
FIG. 2 shows typical signal flows.

FIG. 2 shows typical signal flow between a MASTER node and a SLAVE node for timer synchronization. The MASTER node may either be the central unit 10, or it may be one of the nodes 21, 22, 23. Also the SLAVE node may either be the central unit 10, or it may be one of the nodes 21, 22, 23. The scheme of FIG. 2 just shows possible communication between two entities. It is noted that frames or signals for timer synchronization may especially be separate to frames or signals defining pulse width modulation. However, they may also be combined.

At first, there may by a synchronization signal SYNC sent from the MASTER to the SLAVE. This synchronization signal SYNC comprises a current timer value $t1_{master}$ of the MASTER's internal timer. The slave uses this information in order to synchronize its own internal timer, namely by adding, to the timer value $t1_{master}$, a delay value and by setting its own internal timer to the thus calculated value.

The next two steps show how to determine the delay value. At first, a first determination signal TREQ is sent from the SLAVE to the MASTER, containing an identifier ID. Immediately afterwards, a second determination signal TRESP with the identifier ID and a timer value $t2_{master}$ of the MASTER is sent back from the MASTER to the SLAVE. The SLAVE is now able to calculate a round-trip time and thus to calculate the delay value. As a rule, the round-trip time minus processing times is twice the delay value. In order to smoothly adapt the delay value, the previous delay value may be added to the currently determined delay value, and the sum may be divided by 2 in order to get the new delay value.

At later times $t1_{master}$, a respective synchronization signal SYNC may be sent from the MASTER to the SLAVE in order to perform timer synchronization.

Figure 3:
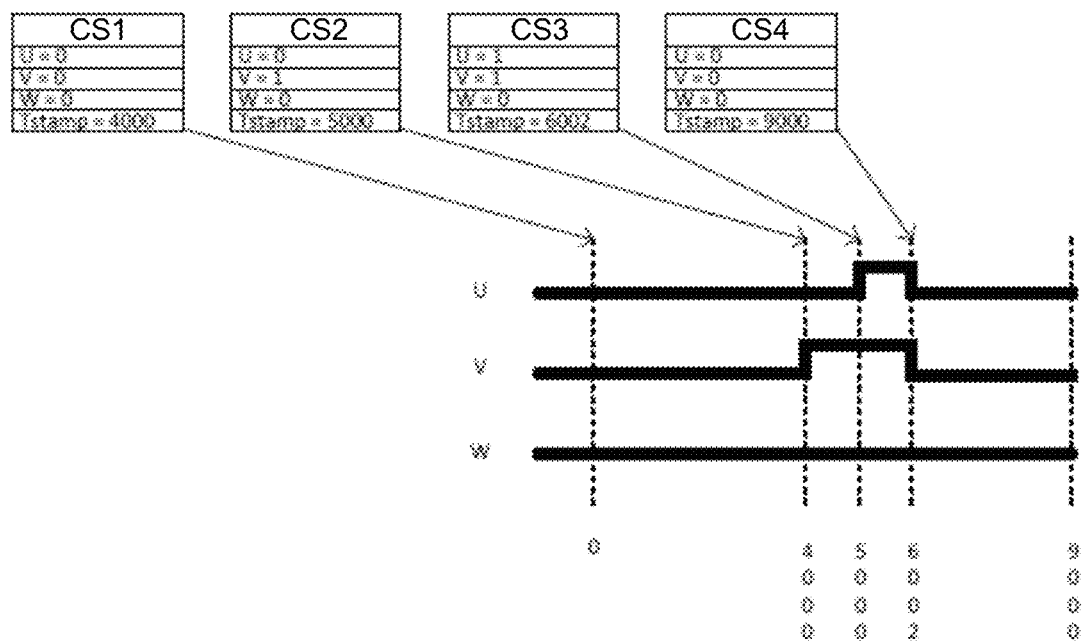
FIG. 3 shows an implementation of control signals.

FIG. 3 shows three phases U, V, W and four corresponding control signals, which are denoted by CS1, CS2, CS3, CS4. Each control signal CS comprises state values for each phase U, V, W and a timestamp in form of an absolute value Tstamp. If a state signal is 0, the respective phase should be off when the control signal CS is applied. If a state signal is 1, the respective phase should be on when the control signal CS is applied.

At the beginning, all phases are off. When the first control signal CS1 is applied, this does not change. After the internal timer of the node, whose values are shown below the phases, has reached the absolute value Tstamp of the first control signal CS1, i.e. a value of 4000, the second control signal CS2 is applied, switching the phase V to on.

After the absolute value Tstamp of the second control signal CS2 has been reached, the third control signal CS3 is applied, switching also phase U to on. After the absolute value Tstamp of the third control signal CS3 has been reached, the fourth control signal CS4 is applied, switching all phases U, V, W to off.

Figure 4:
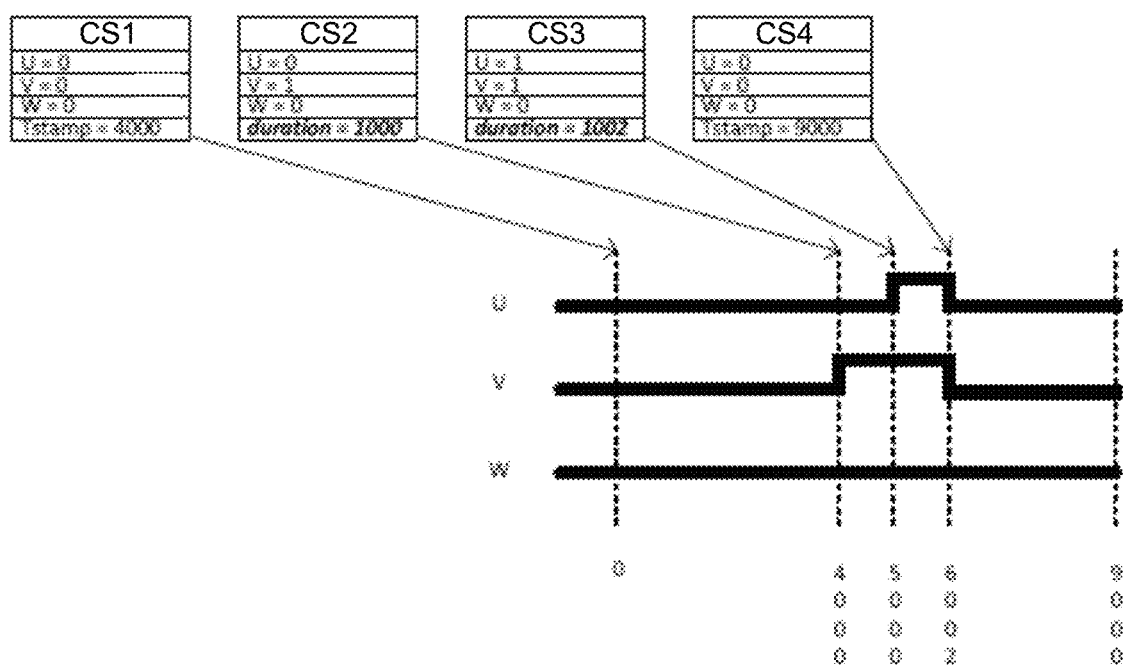
FIG. 4 shows a further implementation of control signals.

The implementation of FIG. 4 shows the same functionality, i.e. an identical switching of phases, but with a slightly different implementation of the second control signal CS2 and the third control signal CS3. These control signals CS2, CS3 do not have absolute values Tstamp, but durations, for the time stamp. They set the intended duration of application of the respective control signal CS2, CS3 starting from the end of application of the previous control signal. As is shown, both implementations of time stamps can be combined, increasing flexibility.

It should be noted that while FIGS. 3 and 4 show an implementation with only two possible values for the phase states, also more than two values can be used in other implementations. For example, each phase state may have three possible values.

In summary, a new approach to providing a pulse-width modulated signal has been disclosed, which allows for a high accuracy and easy implementation.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for providing a pulse-width modulated power signal with one or more phases at a node having a timer, the method comprising the following steps:
   receiving, from a central unit, a control signal, the control signal comprising a state for each of the phases and a time stamp,
   applying the control signal such that each phase is controlled according to the phase's state, until the timer reaches the time stamp, and
   when the timer reaches the time stamp, applying a further control signal received after the control signal.

2. The method according to claim 1,
   wherein the step of applying is repeated consecutively with consecutively received control signals.

3. The method according to claim 1,
   wherein three phases are controlled by the node.

4. The method according to claim 1,
   wherein the timer is driven by a clock of the node.

5. The method according to claim 1,
   wherein the timer is synchronized by receiving a timer synchronization signal from another node and putting the timer to a value being determined by the timer synchronization signal and a delay time.

6. The method according to claim 1,
   wherein the time stamp is given as an absolute value, or as a duration.

7. The method according to claim 1,
   wherein the phases are controlled using respective Insulated Gate Bipolar Transistors or Silicon Carbide MOSFETs of the node.

8. A method for providing a pulse-width modulated power signal using a plurality of nodes and the central unit,
   wherein each node performs a method according to claim 1,
   wherein the central unit sends control signals according to a required pulse-width modulation scheme to the nodes, and
   wherein corresponding phases of the nodes are electrically coupled in parallel.

9. The method according to claim 8, further comprising a timer synchronization, the timer synchronization comprising the following steps:
   sending, from at least one first node to at least one second node, a synchronization signal, the synchronization signal comprising a current timer value of the first node, and
   receiving, at least at the second node, the synchronization signal, and setting the timer of the second node to a value calculated as the current timer value comprised in the synchronization signal plus a delay value.

10. The method according to claim 9,
    wherein the timer synchronization is performed in specified time intervals during operation.

11. The method according to claim 10,
    wherein the time interval is at least 10 µs, at least 20 µs, at least 100 µs, or at least 500 µs; and/or at most 100 µs, at most 500 µs, or at most 1 ms; or 50 µs.

12. The method according to claim 9, further comprising a delay value determination, the delay value determination comprising the following steps:
    sending, from at least one first node to at least one second node, a first determination signal,
    receiving, at least at the second node, the first determination signal, and immediately after receiving the first determination signal sending, from at least the second node, a second determination signal back to at least the first node, and
    calculating the delay value based on a round-trip time of the determination signals.

13. The method according to claim 12,
    wherein the delay value determination is performed with startup and/or during run-time of the nodes and the central unit.

14. The method according claim 12,
wherein the delay value is calculated by calculating a sum of the round-trip time and a previous delay value, and dividing the sum by two.

15. A node for providing a pulse width modulated power signal being configured to perform a method according to claim 1.

16. A system for providing a pulse-width modulated power signal comprising a plurality of nodes and a central unit, the nodes and the central unit being configured to perform a method according to claim 8.

17. The method according to claim 2, wherein three phases are controlled by the node.

18. The method according to claim 3, wherein the timer is driven by a clock of the node.

19. The method according to claim 2, wherein the timer is synchronized by receiving a timer synchronization signal from another node and putting the timer to a value being determined by the timer synchronization signal and a delay time.

20. The method according to claim 3, wherein the timer is synchronized by receiving a timer synchronization signal from another node and putting the timer to a value being determined by the timer synchronization signal and a delay time.

\* \* \* \* \*